United States Patent [19]

Krüger et al.

[11] Patent Number: 4,488,179
[45] Date of Patent: Dec. 11, 1984

[54] TELEVISION VIEWING CENTER SYSTEM

[75] Inventors: H. Eckhard Krüger, Hildesheim-Sorsum; Bernd Freienstein, Hildesheim; Thomas Schäfer, Schellerten, all of Fed. Rep. of Germany

[73] Assignee: Robert Bosch GmbH, Stuttgart, Fed. Rep. of Germany

[21] Appl. No.: 304,982

[22] Filed: Sep. 23, 1981

[30] Foreign Application Priority Data

Sep. 27, 1980 [DE] Fed. Rep. of Germany ....... 3036552

[51] Int. Cl.³ .......................... H04N 5/50; H04N 5/44
[52] U.S. Cl. ..................................... 358/181; 358/147; 358/194.1; 358/191.1; 358/198; 358/188
[58] Field of Search ............... 358/188, 181, 143, 147, 358/191.1, 194.1, 183, 335, 193.1; 455/181, 186, 151, 132, 133, 70; 360/33.1, 69, 71, 74; 369/7, 19, 47; 340/709; 235/462

[56] References Cited

U.S. PATENT DOCUMENTS

| | | | |
|---|---|---|---|
| 4,031,548 | 6/1977 | Kato et al. | 358/335 |
| 4,079,419 | 3/1978 | Siegle et al. | 358/143 |
| 4,305,101 | 12/1981 | Yarbrough et al. | 360/69 |
| 4,329,684 | 5/1982 | Monteath et al. | 235/462 |
| 4,337,480 | 6/1982 | Bouvassin et al. | 358/188 |

FOREIGN PATENT DOCUMENTS 690473 10/1979 U.S.S.R. ............................. 340/709

OTHER PUBLICATIONS

Russell, "Teletext Remote Control-2", *Wireless World*, May, 1979, pp. 83-86.

*Primary Examiner*—John C. Martin
*Attorney, Agent, or Firm*—Frishauf, Holtz, Goodman & Woodward

[57] ABSTRACT

At least two television reception tuners are used in a viewing center system, one for the television signals and the other for supplementary information transmitted during the blanking intervals and separated in the reception center by a data separation stage. A programmable control stage including a microprocessor accepts information not only from the data separator, but also from a manual remote control input device and from a timing control stage. A signal source switching unit for both the audio part and the composite video part of television signals is controlled by the microprocessor and interconnects signal sources including the tuners and auxiliary equipment, such as recording devices, a local camera, television games, and so on, with audio and video output devices. A digital data bus provides control to the various input and output devices.

1 Claim, 3 Drawing Figures

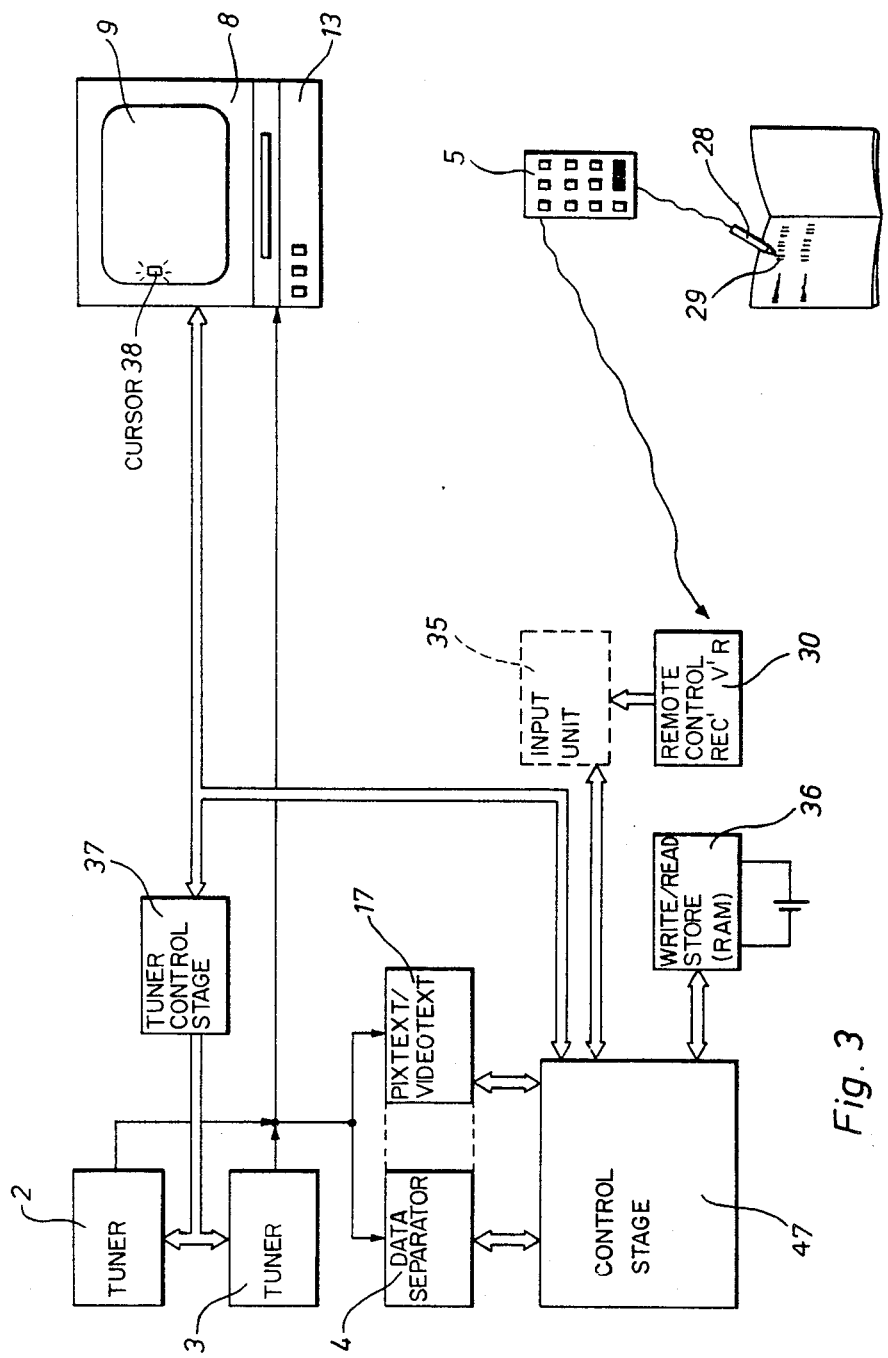

TELEVISION VIEWING CENTER SYSTEM

This invention concerns a combination of apparatus for television viewing that makes it possible for the viewer to display on a television screen not only signals received by radio or cable but signals reproduced from record or provided by a local camera, or to call into play a videotext device or a television game apparatus, all at the command of a remote control unit with manual push button controls and the like. In particular, the viewing center system of the present invention is for television transmissions and television receiving equipment in which the television picture blanking interval is used for the transmission of supplemental information, particularly information identifying the program, a program source, and perhaps the transmitter, by digital signals, for example as disclosed by the pending application of the assignee at the present application, Diepholz et al, Ser. No. 266,900, filed May 26, 1981.

Television receiving apparatus has in recent years been utilized in conjunction with auxiliary apparatus at a viewing location as well as for receiving television broadcasts, such auxiliary apparatus including television recording and reproducing equipment, television game playing equipment, so-called screentext and videotext devices accepting inputs from a local keyboard and/or a telephone line, and even local television cameras. The connecting up of these various equipments acquired at different times often presents problems and frequently involves radio frequency or intermediate frequency transmission to a receiving circuit of the television receiver that raises possibilities of undesired radio interference.

SUMMARY OF THE INVENTION

It is an object of the present invention to provide for easily selectable use of a television viewing equipment for broadcast reception or for use with any of the aforesaid kinds of auxiliary equipment with a convenient control for the user and with reliable and easily switched interconnections. In particular it is an object of the present invention to make the foregoing possible by use of a programmable control that provides digital control signals to the various components of the system and that responds not only to manually keyed selections or commands but also to encoded information transmitted in the television blanking interval by broadcast transmitter and to encoded program information that may be distributed in printed periodicals distributed a few days or a week in advance of program broadcasts.

Briefly, the television viewing center system has a receiving stage that has at least two television reception tuners, one for the television signals and the other for supplementary information that is separated by a data separation stage. The system also comprises a programmable control stage that preferably includes a microprocessor and accepts information from a manual remote control input device, from radio broadcasts through the aforesaid data separation stage, and preferably also from a timing control stage. The system also comprises a signal source switching unit for both the audio part and the composite video part of television signals and a digital data bus for control purposes extends from the programmable control stage to the television display unit and to the various pieces of auxiliary apparatus, as well as to the signal source switching stage.

The data separation stage connected to one of the tuners can provide not only supplementary information such as the transmitter program identification, but also synchronizing and control signals.

As a further development of the invention, the programming of the control stage, instead of directly responding to the outputs of the data separating stage, can be caused to respond selectively to the broadcast supplementary information by having the supplementary information displayed on the picture screen and then selectively picked up, for example by a light sensitive scanning pickup pencil connected to the remote control input device that is manipulated by the user of the system. Such an arrangement can be made even more convenient for the user by providing for the generation of a cursor signal that can be steered to any location of the picture screen by the manually activated remote control device so as to select the information displayed at the cursor's location on the screen or entered into the programmable control stage.

Even with the latter version of the system of the invention, it may be useful to have a light-sensitive pencil pickup connected to the remote control unit in order to scan digitally program information from a printed page, printed card, or the like.

The advantages of the invention are particularly that because of the versatile and rapid capability for connecting and disconnecting various picture and sound devices and the control of these devices by control lines of the data bus type, it is possible to produce the entire video center system on a modular basis and, furthermore, because of the provision of supplemental program identification signal on a digital basis at the broadcast station, the user can set the center for recording particular programs in his absence, without loss of the recording if the time of the transmission should be changed during his absence.

THE DRAWINGS

The invention is further described by way of illustrative example, with reference to the annexed drawings, in which:

FIG. 3 shows a modified form of the system of FIGS. 1 and 2 incorporating certain simplifications.

DESCRIPTION OF THE ILLUSTRATED EMBODIMENTS

Figure 1:
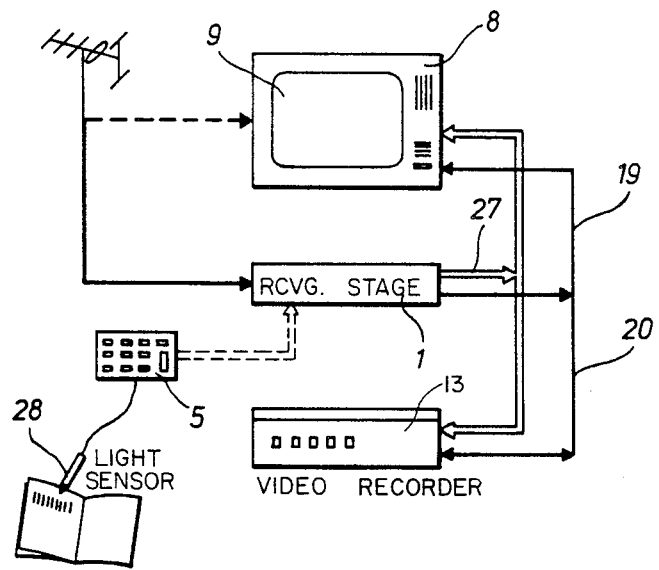
FIG. 1 is a basic diagram in its simplest form reproducing television reception and viewing system according to the invention.
Figure 2:
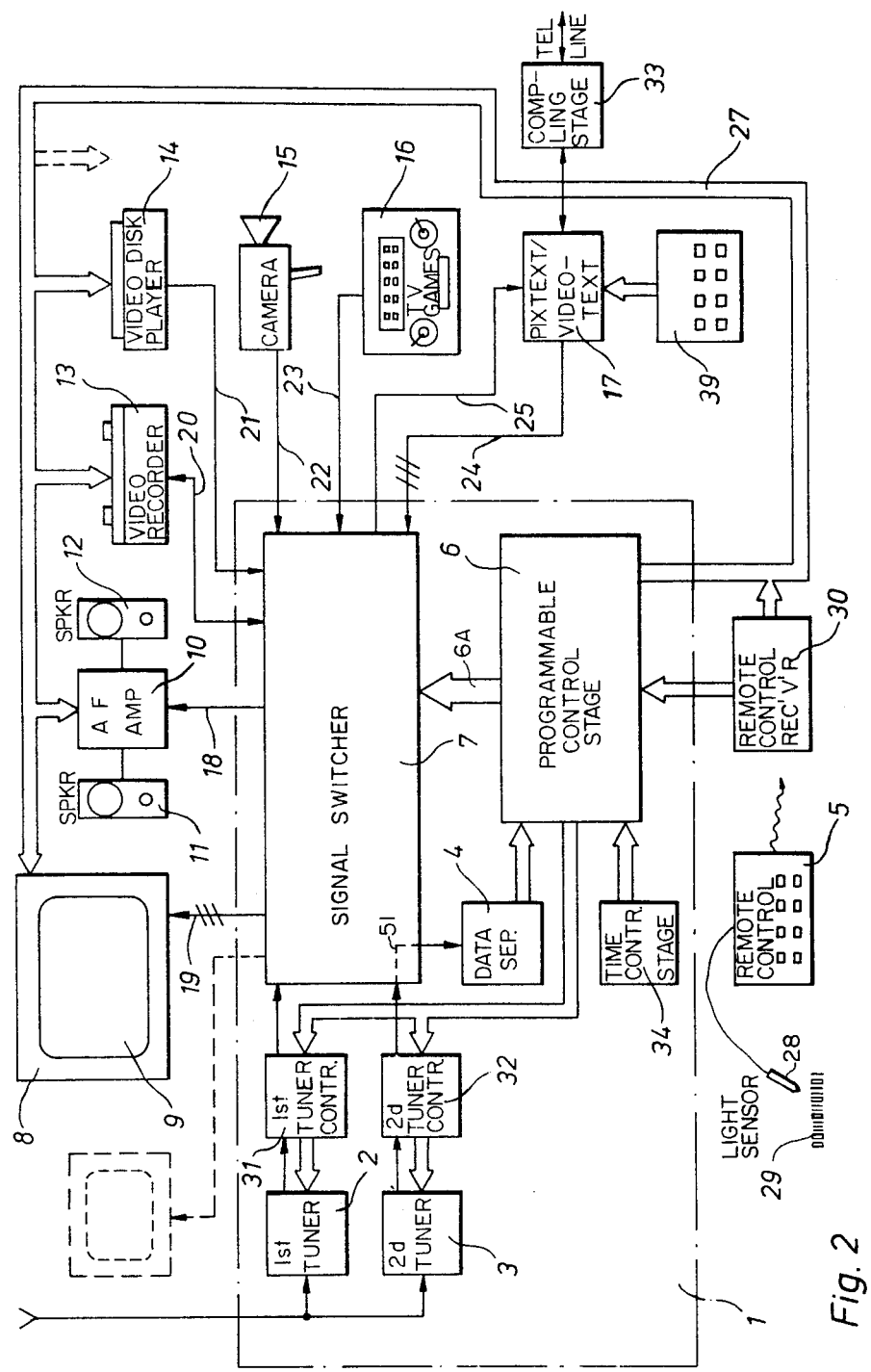
FIG. 2 is a more detailed block diagram of the system of FIG. 1.

FIG. 1 shows a receiving stage 1 connected to respond to signals from an antenna shown at the upper left of the figure. The receiving stage 1, the components of which are more fully shown in FIG. 2, has one output in the form of a multibit bus 27 for digital control signals for control of the television display unit 8 which may be referred to as a monitor and has a viewing screen 9. The output 27 also leads to the television recorder 13. The television signal output of the receiving stage 1 goes by way of the line 19 to the display unit 8 and by way of a line 20 to the television recorder 13. The connections 19 and 20 symbolize not only the lines for the composite video signal with or without the sound carrier, but also the corresponding audio lines in the event that the sound carrier is demodulated in the unit 1, as for example is shown in FIG. 2. The receiving stage 1 is controlled by a remote control unit 5 with a manually operable keyboard and a pencil-like light sensor 28 for reading digital signals printed as an array of stripes, such as are shown at 29 printed on a page of a periodical relating to television programs. The unit 5 thus permits transfer of digital signals from the printed material 29 to the receiving stage 1.

FIG. 2 shows the system of FIG. 1 with more detail and with additions of further peripheral units. The connection 5 may lead to an antenna or to a cable distribution system for television signals and supplies the television signals to two separate tuners 2 and 3 in the receiving stage 1. These tuners are respectively controlled by tuner-control stages 31 and 32 and the tuner outputs are shown passing through these control stages to enter the signal source transfer switching stage 7. The tuner 2 is utilized for furnishing television signals for distribution by the transfer switching stage 7, whereas the output of the tuner 3 passes through the stage 7 to the input of a data separation stage 4, the broken line 51 being symbolic of the fact that the connection between the output of the tuner 2 and the data stage 4 may be either direct or through a switching function in the transfer switching stage 7. The supplementary information contained in the received television signals, which may for example be of the kind referred to in the aforesaid co-pending application Ser. No. 266,900, are separated from television signals in the stage 4 and are supplied to the programmable control stage 6 to which the controlling or programming information supplied by the remote control unit 5 is also supplied. Stage 6 is connected to a remote control receiver 30 for receiving signals from the remote control unit 5 in any of the usual ways by which remote control signals are commonly provided for television receiving sets. The light sensitive pickup 28 for reading printed program data 29 is again shown in FIG. 2. The television display unit 8, and with it the television picture screen 9, the television recorder 13, the video disc player 14, the television camera 15, the television game unit 16 and the screentext/videotext apparatus 7 are all connected, over video signal lines 19, 20, 21, 22, 23, 24, and 25, with the television signal source transfer switching unit 7. An audio line 18 is provided for connecting the signal source transfer unit to the sound reproducing equipment which consists of an audio amplifier unit 10 and loudspeakers 11 and 12 in the illustrated case. The control stage 6 has a connection to a time-control unit 34, for providing time of day information and the like. Control stage 6 has a data output 6a for providing digital signals for controlling the television signal source transfer switching unit 7 to make the television signal connections between the various units of the system.

The screentext/videotext apparatus 17 has a keyboard input unit 39 and is also connected through a coupling stage 33 to a telephone line through which sequential digital data that is commercially distributed may be provided.

The programmable control stage 6 has a multiple bit digital output 27 that serves as the control bus for various stages and other auxiliary apparatus of the viweing center system can be connected together and put into a round of operation.

FIG. 3 shows a simplified diagram of a television viewing center system according to the invention in which the data separation stage 4 and the screentext/videotext apparatus 17 are combined into a single unit to which the tuners 2 and 3 provide their outputs, so that multiple use of a number of circuit components can lead to a simpler construction.

The control stage 47 similarly combines the functions of a signal source switching unit 7 and the programmable control stage 6 of FIG. 2. The control stage 47 is for example constituted by a microprocessor, as is also the input unit 35 to which the remote control receiver 30 furnishes signals received from the remote control transmitter unit 5 that is again equipped with a light sensitive data pickup pencil 28 for printed data signals 29, which may be coded in bar code as shown in FIG. 2. The random access memory 36 serves the control stage microprocessor 47 in the usual way, both in connection with the supplementary information contained in the television signals, as separated out by the data separator 4, and in connection with the screentext/videotext equipment 17, again providing the economy of multiple use of a component unit of the system.

The control stage 47 can be programmed by the remote control unit 5, either by scanning of a strip code 29 by the light sensitive pickup 28 or by holding the pickup 28 at the location of the screen 9 where the supplementary information with which the control stage 47 is to be programmed happens to be displayed.

It is also possible to provide the programming by the supplementary information separated from television signals by means of a cursor 38 visible on the picture screen which is controllable in its position by the remote control 5 and is set at the beginning of the line in which the particular supplementary information is displayed by which it is desired to program the control stage 47.

The manner of operation of the television viewing center of the invention can be scheduled in advance by programming the control stage 47 with the station identification, program identification and any other data provided as supplementary information in television signals, so that practically any choice of programs among the available television channels can be provided. By the monitoring of various television channels with the second tuner which for example may consecutively scan and evaluate the individual channels so that it is recognizable whether any of the channels is radiating a transmission that, on the basis of the programming of the control unit 47 is to be recorded or reproduced, a very great variety of possibilities of program scheduling can be provided for the user of a television viewing system according to the invention. The control of the tuners 2 and 3 in FIG. 3 is produced by a tuner control stage 37 that is equipped to control the two tuners individually.

The system of the invention can be constituted by a collection of modules in a variety of ways and the display unit 8 can be a conventional television receiver if desired. It is advantageous, however, to dispense with certain unnecessary circuit stages in the individual modules when a modular design is used, as for example, omitting an individual tuner in the television recorder unit.

We claim:
1. A television viewing center system having capability for receiving, along with radio-transmitted television signals, supplementary information signals radio-transmitted with the television signals from the same transmitter and relating to transmitted television signals, comprising, in combination:
a receiving stage for receiving television signals from a remote source by cable or an antenna, said stage including first and second television reception tuners (2,3) and tuner control means (31,32,37) for controlling the tuning of said tuners;

a data separateion stage (4) connected for receiving the output of said second tuner (3);

a programmable control stage (6,47) having three outputs and first, second and third inputs responsive to digital signals received from said data separation stage (4) and to other digital signals supplied from at least one source (30,34) within the viewing center system, for providing control signals from a first of said outputs to said tuner control means (31,32,37) and from a second and a third of said outputs to other components of the system, said programmable control stage including means for causing said second tuner to scan stepwise a set of receiving channels for obtaining said supplementary information signals therefrom and also means for evaluating supplementary signals thereby obtained with reference to information stored in said control stage;

a signal source transfer switching unit (7,47) for switching composite video signals and audio signals related thereto from any of a plurality of sources, including said first television reception tuner, to any of a plurality of outputs, said transfer switching unit being connected, for control of its operation, to said second output of said programmable control stage;

a television display unit (8) having a television picture screen (9) and connected to an output of said transfer switching unit;

means responsive to data separated from the output of said second television reception signals through said transfer switching unit to said television display unit (8) for displaying supplementary information on the television screen (9) thereof;

a sound reproduction system including at least one loudspeaker and at least one audio amplifier (10,11,12) and connected to an output of said transfer switching unit;

means for recording and reproducing television signals (13,14), connected to an output and to an input of said transfer switching unit;

a plurality of additional television signal sources (15,16,17) connected respectively to a plurality of inputs to said transfer switching unit;

output digital data bus means connecting said third output of said programmable control stage (6,47) for control purposes of said television display unit (8), said sound reproduction system (10,11,12), said television recording and reproducing means (13,14) and said additional television signal sources (15,16,17);

a remote control receiver (30), having its output connected with an input of said programmable control stage, for providing signals including signals to be stored in said programmable control stage, and remote control manually operable programmable means (5), for providing signals to said remote control receiver (30) from locations in the general vicinity of said receiver, having therein means for sensing the display of said supplemental information on said screen for supplying said information through said remote control receiver (30) to said programmable control stage, and means for producing a controllable cursor signal for selecting supplementary information displayed on said screen in response to digital signals provided by said data separation stage (4) and causing the information selected by said cursor to be provided as an input to said programmable control stage.

* * * * *